United States Patent [19]

Farrant

[11] 4,135,582

[45] Jan. 23, 1979

[54] PLOUGH

[76] Inventor: David J. Farrant, Welshes Farm, Clatworthy, Wiveliscombe, Somerset, England

[21] Appl. No.: 751,483

[22] Filed: Dec. 16, 1976

[30] Foreign Application Priority Data

Dec. 18, 1975 [GB] United Kingdom ............... 51911/75

[51] Int. Cl.² ........................................... A01B 69/00
[52] U.S. Cl. .................................... 172/280; 172/311; 172/314
[58] Field of Search ............... 172/311, 312, 280, 281, 172/742, 692, 693, 318, 320, 315, 316, 744, 695

[56] References Cited

U.S. PATENT DOCUMENTS

| 3,791,673 | 2/1974 | Hornung | 172/311 X |
| 3,983,944 | 10/1976 | Farrant | 172/692 X |
| 4,036,306 | 7/1977 | Kinzenbaw | 172/693 X |

FOREIGN PATENT DOCUMENTS 117491 9/1943 Australia .................................. 172/311

Primary Examiner—George J. Marlo
Attorney, Agent, or Firm—Oblon, Fisher, Spivak, McClelland & Maier

[57] ABSTRACT

This invention is a plough consisting of at least two booms pivotally connected together about a joint which can be locked to enable the booms to extend in line with each other, each carrying plough shares extending to one and the other side of the tractor so that a very large number of shares can be pulled by a single tractor. The pivot joint can be released to enable one boom to swing in relation to the other when not ploughing so that the total width of the tractor and plough is not too great to be driven along roads and through narrow openings into fields and so on. There may be boom at the other end of the fixed boom capable of pivoting about a similar joint towards the tractor. The one boom is arranged to be mounted on the tractor three point linkages so that it can be lifted by that linkage when not ploughing, and the other, or other booms can have wheels associated with jacks for lifting the shares clear of the ground enabling the wheels to run over the ground when not ploughing.

11 Claims, 4 Drawing Figures

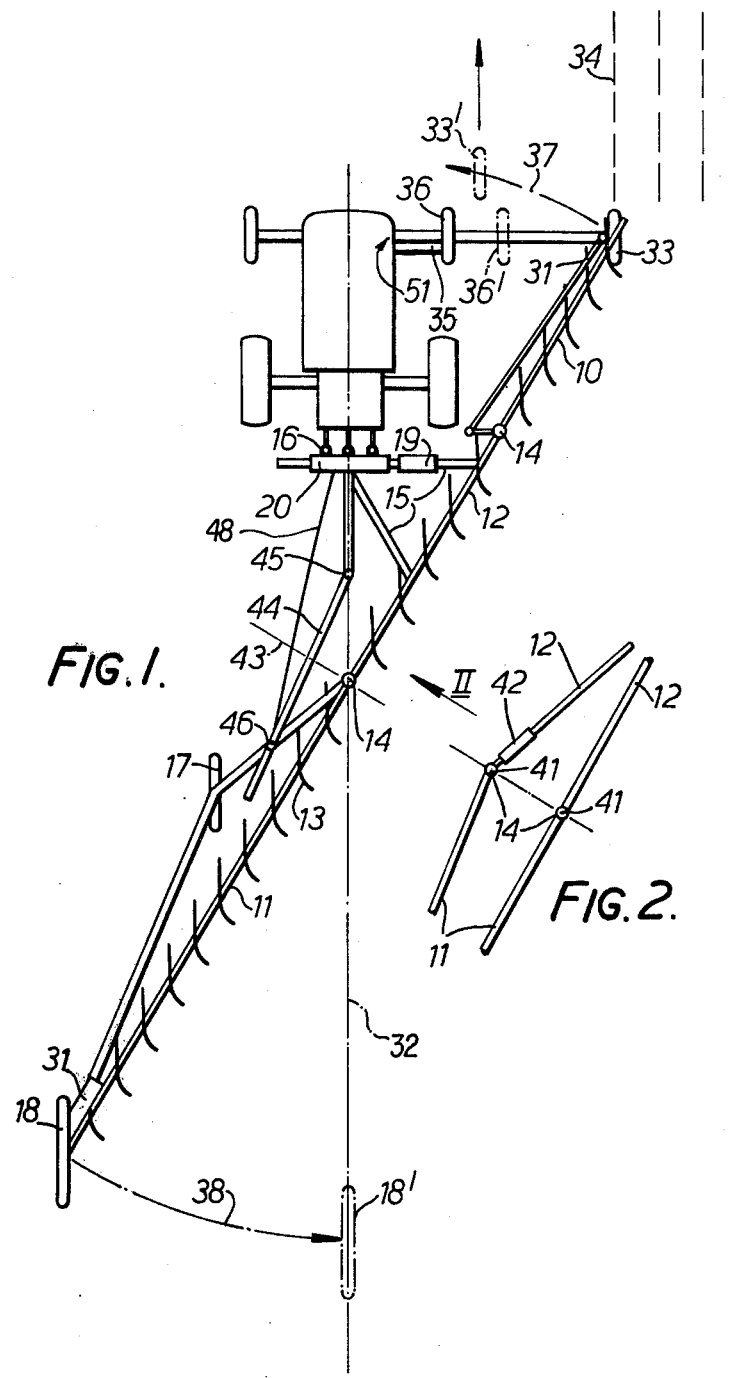

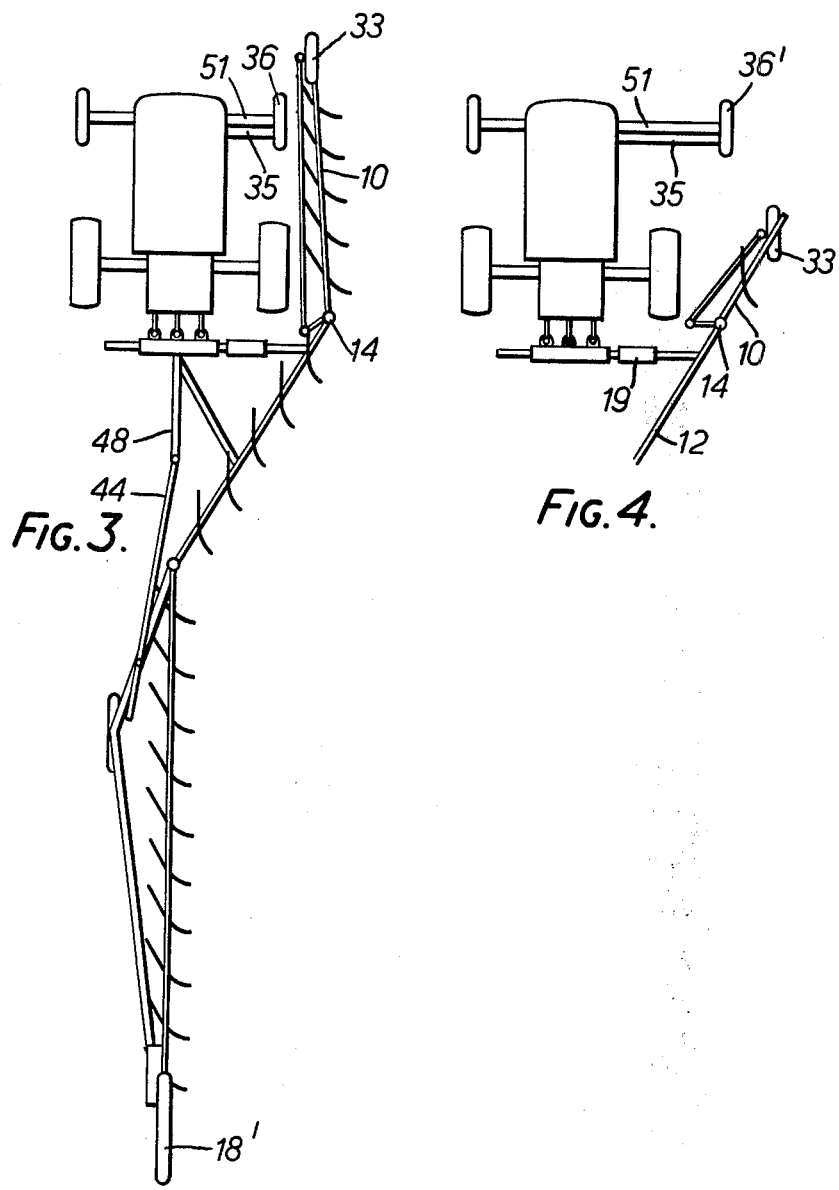

PLOUGH

BACKGROUND OF THE INVENTION

This invention relates to ploughs and one object is to provide a construction of plough enabling a large number of furrows to be ploughed at one pass from a single tractor.

SUMMARY OF THE INVENTION

According to the present invention a plough comprises two booms each carrying plough shares, the boom being pivotally joined at adjacent ends, one boom having a frame enabling it to be carried on the rear linkage of a tractor while the second boom has a depth controlling device at the end remote from the pivot.

Preferably the arrangement is such that when the one boom is supported on the tractor linkage points, the pivot is generally in line with the fore-and-aft axis of the tractor.

The one boom and its frame are preferably arranged so that when supported from the tractor the one (or front) boom extends somewhat to one side of the tractor, while the rear boom when in line with the front boom extends approximately an equal amount to the other side of the tractor. That means that the drag on the tractor is generally controlled so that it does not tend to cause the tractor to 'crab'. Also the tractor never has to run over furrows, but a second set of furrows can be ploughed with the tractor running over unploughed land. This enables a powerful tractor to be used and advantage to be taken of the full tractive effort provided by its large wheels.

Preferably there are means for locking the pivot so that during use it provides a rigid joint between the booms at least for turning about a vertical axis.

There may be a depth controlling wheel at the front of the front boom but it will generally be possible to lift the shares on the front boom when it is desired to turn the plough by operation of the tractor linkage.

There may also be a power actuator between the tractor linkage and the one boom for adjusting its position in relation to the tractor.

The depth control device is conveniently a wheel which may be mounted on a hydraulic jack to be used for lifting the shares from the ground or allowing them to be inserted in the ground ready for ploughing. Such a wheel could have two positions, one of which will be generally parallel with the fore-and-aft axis, that is to say the direction of movement during ploughing while the other is generally parallel with the line of the boom so that the boom can be towed when not used for ploughing when not used for ploughing in a straight line behind the tractor.

BRIEF DESCRIPTION OF THE DRAWINGS

The invention may be carried into practice in various ways and one embodiment will be briefly described by way of example with reference to the accompanying drawings, of which;

FIG. 1 is a sketch showing a tractor pulling a plough according to the invention seem from above, FIG. 2 is a detail seen in the direction of the arrow II.

FIG. 3 is a schematic representation of the alignment of the booms when on the road, and FIG. 4 is a schematic representation of a second embodiment of the invention.

DESCRIPTION OF THE PREFERRED EMBODIMENTS

Referring now to the drawings, wherein like reference numerals designate identical or corresponding parts and more particularly to FIG. 1 thereof, the plough consists of three booms 10, 11, 12, each of which is built up from a desired number of similar standard boom sections carrying one plough share 13. In the example being described the booms have respectively five, ten and five shares 13, making in all twenty equally spaced shares. The booms are joined at universal joints 14 which prevent any movement about a vertical axis, or about the boom axis during ploughing, but permit relative movement about a horizontal axis transverse to the boom to allow for variations in the level of the field.

The middle boom 12 is carried on frame work 15 mounted to slide under the control of a hydraulic actuator 19 transversely along a frame 20 carried on the three point suspension 16 of the tractor, and there is a small wheel acting as a depth gauge at 17.

At the rear of the rear boom 11 is a wheel 18 which can be set by a hydrualic actuator 31 either at a height to lift the shares 13 from the ground or to have them in the ground at a predetermined depth. Also it can be manually or hydraulically operated so that the wheel is in a fore-and-aft plane as shown in FIG. 1 for use when ploughing or alternatively is in a vertical plane containing the axis of the boom for use when carrying the plough along a road or along a field not being ploughed.

It will be observed that there is an equal length of boom on either side of the fore-and-aft axis 32 of the plough, and this means that the drag on the tractor is centralised, and the tractor does not tend to skew or crab.

The front boom 10 has a guide wheel 33 which can be guided to run along the end furrow 34 which has just been ploughed, and a steering connection 35 is coupled to the tractors front wheels 36 so that steering of the tractor keeps the wheel 33 in the furrow. The wheel has an actuator 31 for lifting its shares.

After one set of furrows has been ploughed, the tractor can be turned after lifting the shares by use of the three-point suspension 16 to lift the middle boom 12 and the actuator 31 to lift the front and rear booms. Thus the plough then runs over land which has not previously been ploughed.

This means that a modern 200 horspower tractor with large wheels can be used and running over unploughed land that can plough one furrow for every 10 horsepower provided the drag is reasonably centred on the axis 32. Of course the actual number of shares will depend upon the particular requirements, but the booms can be built up to the required size and will always have an approximately equal extent to right and left of the tractor. The pivot point 14 is generally in line with the fore-and-aft axis of the tractor.

For use on the road the wheel 18 is set into a vertical plane containing the boom 11, the wheel 33 is released from its steering connection, and the joints 14 are released so that the booms 10 and 11 can turn in relation to the boom 12 as shown at 37 and 38 and in FIG. 3, to give a total width of tractor and plough which is merely the width of the tractor plus the part of the boom 12 to its right which is considered to be an acceptable width for most roads.

The pivots are generally similar. FIG. 2 shows how the rear pivot 14 has upper and lower ball joints vertically, one above the other, and each having one connection as a part of each boom 11 and 12. At the top the connection to the ball joint is through a lost motion connection 42 to allow movement about the axis 43.

A rod 44 extends from a connection 45 on the frame 15 to a sliding joint 46 on the rear boom 11. When a catch is engaged, the joint 46 cannot slide and the booms are held in line, but when the catch is released by a line 48, sliding is permitted so that the boom 11 can turn to be along the axis 32 for use on the road.

The arrangement at the front pivot 14 is similar. It is also useful to release the pivots 14 to give a tight turning circle at the end of the line of ploughing so that the headland is no greater than normal. The shares are lifted, the rear joint 14 released by the line 48 and the tractor turns into the headland. The booms 11, and 10 are lowered, the front joint 14 locked, the line 48 released, and the tractor started. As the rear boom 11 turns into line with the front boom, the catch re-engages and the booms are held aligned through the next line of ploughing.

For use if the front boom does not extend to the level of the tractor's front wheels, the offside front wheel of the tractor is mounted on an extensible axle 51 so that it can be extended to be in line with the front of the front boom 10 as shown at 36' in FIG. 4. Then the tractor can be steered so that the extended front wheel runs in the end furrow previously ploughed and the spacing of the new furrows can be easily maintained, without the driver having to look over his shoulder at the leading share.

What is claimed as new and desired to be secured by Letters Patent of the United States is:

1. A plough comprising:
   two booms carrying plough shares; and
   a frame mounted on one of said booms,
   said two booms being pivotally connected at adjacent ends, one boom extending from the pivot point forwardly and to one side of said frame and having an end forward of the frame with respect to the direction of plowing, and the other boom extending from the pivot point rearwardly and to the other side, either boom being provided with a ground wheel at the end remote from said pivot point,
   said frame including means for attachment to a standard three-point suspension on a tractor, said means for attachment being substantially in line with said pivot point with respect to the direction of ploughing.

2. A plough as claimed in claim 1 including a third boom having one end pivotally mounted to the other end of the one boom which third boom also carries plough shares.

3. A plough as claimed in claim 2 in which the third boom has a depth controlling device at the end remote from its pivot.

4. A plough as claimed in claim 3 in which the depth controlling device comprises a jack on the ground wheel capable of lifting the boom in relation to the wheel, or lowering the boom to allow the shares of the boom to be inserted in the ground.

5. A plough as claimed in claim 2 in which the third boom extends forward of the one boom and can pivot forwards towards the tractor to reduce the overall width of the tractor and plough.

6. A plough as claimed in claim 5 including means for steering the wheel on the third boom in conjunction with steering movement of the front wheels of the tractor.

7. A plough as claimed in claim 1 including means for positioning the wheel to be in a plane generally parallel with the fore-and-aft axis of the tractor, or in a plane generally in line with the boom.

8. A plough as claimed in claim 1 in which each pivot joint permits relative movement between the booms on either side of it about a horizontal axis transverse to the vertical plane containing the booms, but does not permit relative rotation between the booms about the axis of the booms, but does include means capable of locking the joint during ploughing against relative movement between the ends of the booms about a vertical axis through the joint at least in one direction.

9. A plough as claimed in claim 8 in which the locking means are releasable to allow the booms to pivot about the said vertical axis when not ploughing.

10. A plough as claimed in claim 1 including a power actuator between the one boom and the frame capable of adjusting the position of the boom in relation to the tractor linkage.

11. A plough as claimed in claim 1 in combination with a tractor having a front wheel on a extensible mounting enabling the wheel to be positioned away from the side of the tractor in line with the leading plough share.

* * * * *